UNITED STATES PATENT OFFICE.

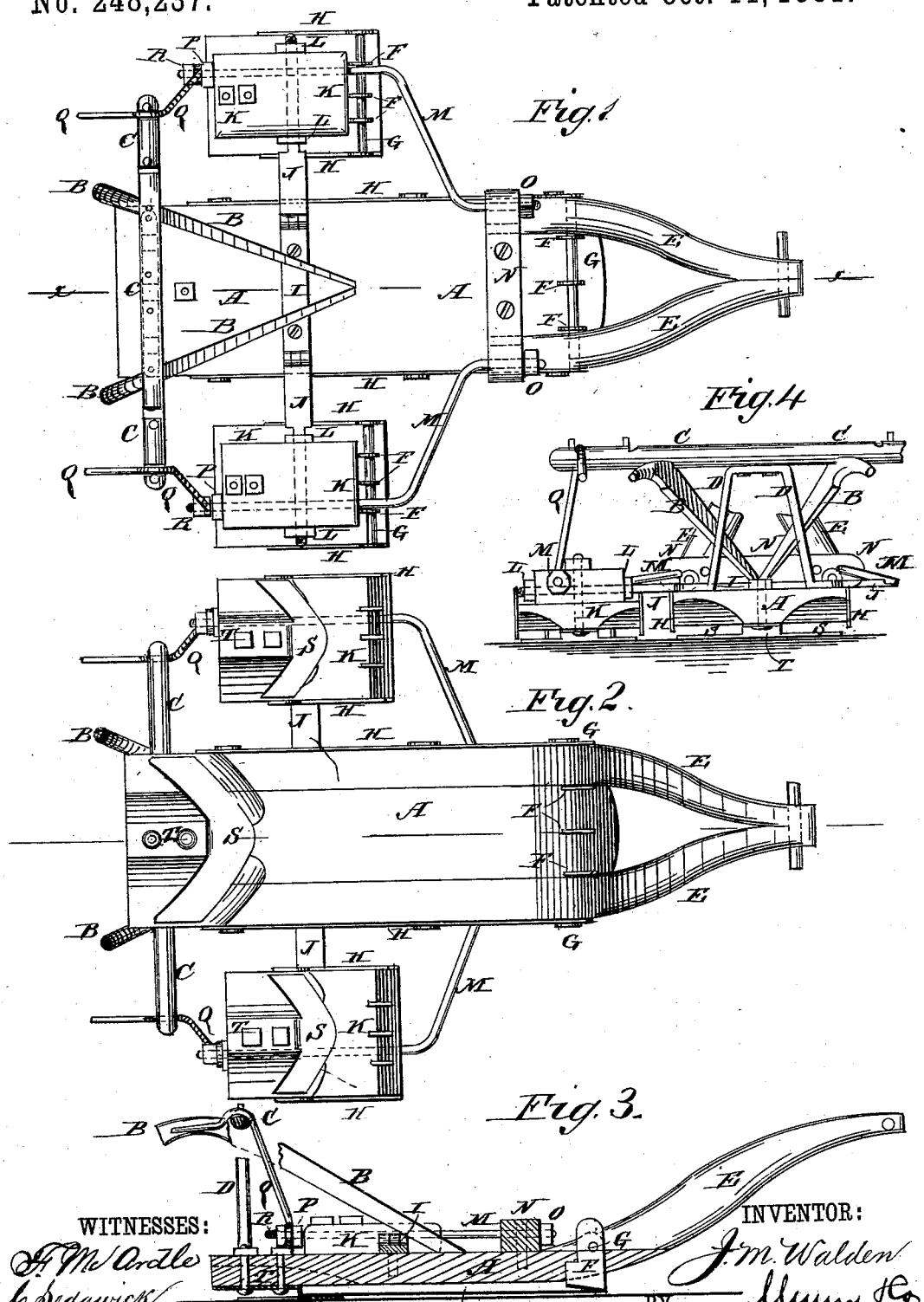

JOHN M. WALDEN, OF FORT VALLEY, GEORGIA.

COTTON-CHOPPER.

SPECIFICATION forming part of Letters Patent No. 248,237, dated October 11, 1881.

Application filed June 21, 1881. (Model.)

*To all whom it may concern:*

Be it known that I, JOHN MILLEDGE WALDEN, of Fort Valley, in the county of Houston and State of Georgia, have invented a new and useful Improvement in Cotton-Choppers, of which the following is a full, clear, and exact description.

Figure 1 is a plan view of my improvement. Fig. 2 is an under-side view of the same. Fig. 3 is a sectional side elevation of the same taken through the line $x\,x$, Fig. 1. Fig. 4 is a rear elevation of a part of the same.

The object of this invention is to facilitate the chopping of cotton-plants to a stand.

A represents the main or central body of the chopper, which is made of a width equal to the space required to be left between the hills.

To the upper side of the middle part of the body A are attached the forward ends of the handles B, which meet at an angle. The rear parts of the handles B are attached to cross-bar C, by which the said rear ends are kept at a suitable distance apart. The ends of the cross-bar C project and have notches formed in them, or pins attached to them, to receive and hold rods, hereinafter described. The cross-bar C and the handles B are supported at a suitable height by standards D, attached to the said cross-bar and to the rear part of the body A.

To the forward corners of the body A are attached the rear ends of two bars, E, which are curved inward so that their forward ends meet at an angle, to adapt them to receive the draft attachment. In mortises in the forward end of the body A are inserted three or more knives, F, the lower ends of which project at the lower side of said body A to cut the crust of the soil and prevent it from being broken away by the chopping-hoe. The upper ends of the knives F project above the body A, and have holes formed through them to receive the rod G, which also passes through holes in the forward ends of the plates H, attached to the side edges of the body A. The lower edges of the plates H project below the lower side of the body A, to enter the soil, and thus separate the plants to be chopped from the plants to be left for a stand, to prevent the plants to be left for a stand from being torn away by the soil when operated upon by the chopping-hoes.

To the upper side of the body A, a little in the rear of its center, is attached a cross-bar, I, of a length a little less than the width of the said body A.

To the ends of the bar I are hinged the ends of two bars, J, the outer parts of which are rounded off and pass through a hole in the projecting middle part of the side bodies, K, and have screw-threads cut upon them to receive nuts L, by which the said bodies are secured in place upon the said bars J.

Through the upwardly-projecting part of each side body, K, near its outer edge, is formed a longitudinal hole, to receive the rod M. The rods M, at the forward ends of the bodies K, are bent inward and extended to the main body A, where they are bent forward and pass through holes in a cross-bar, N, attached to the upper side of the forward part of the said main body A, where they are screwed in place by nuts O.

Several holes are formed through the cross-bar N, to receive the ends of the rods M, so that the side bodies, K, can be adjusted at a greater or less distance from the main body A, according as more or less plants are required to be left for a stand, the nuts upon the bars J being adjusted to correspond with the adjustment of the said rods M. The draft-strains upon the side bodies, K, are supported by nuts P, screwed upon the rear ends of the rods M, and against which the rear ends of the bodies K rest.

Upon the rear ends of the rods M are placed the ends of rods Q, which are secured in place by nuts R, screwed upon the ends of the said rods M. The rods Q incline inward and upward, and are bent to the rearward, as shown in Figs. 1 and 3, so that they can rest upon the projecting ends of the cross-bar C, where they are held in place by the notches or pins formed upon or attached to the said cross-bar. With this construction the side bodies, K, can be raised and supported above the ground by moving the rods Q inward upon the said cross-bar C. When passing from place to place the side bodies, K, can be turned inward over the central body, A.

The side bodies, K, are provided with knives F, secured in place by rods G, and have plates H attached to their side edges, in the same manner as the central body, A. Beneath the rear parts of the bodies A K K are placed the chopping-hoes S, which are made in angular or curved shape, as shown in Fig. 2, and have shanks T formed upon the rear edges of their middle parts, which are bent upward and then rearward and are attached to the under side of the middle part of the rear ends of the said bodies A K K, the offset or bend being such that the hoes S may project below the lower surface of the bodies A K K far enough to enter the ground to the desired depth. The side parts of the under side of the bodies A K K, beneath and at the rear of the end parts of the hoes S are concaved, to allow the plants and soil to escape from the said hoes freely, the said concavities or recesses extending to the side edges of the said bodies, so that the plants left standing will be supplied with sufficient soil without being covered by the said soil.

In using the chopper it is drawn across the rows of plants, and as it passes from ridge to ridge any grass, weeds, or other rubbish that may adhere to the knives F will drop off into the space between the rows, so that the chopper will be kept clear of rubbish.

Having thus described my invention, I claim as new and desire to secure by Letters Patent—

1. A cotton-chopper, constructed substantially as herein shown and described, consisting of the three bodies connected by the hinged bars I J J and the rods and bar M M N, and provided with the series of knives F, the side plates, H, and the chopping-hoes S, and the handles B, cross-bar C, and suspending-rods Q, as set forth.

2. In a cotton-chopper, the combination, with the bodies A K K, of the hinged bars I J and the rods M, and fastening-bar N, substantially as herein shown and described, whereby the said bodies will be securely connected and hinged to each other, as set forth.

3. The combination, with the body A and knives F, having apertured ends projecting above the body, of the rods G and the plates H, the latter having holes in their forward ends, and the lower ends projected below the lower side of body A, as shown and described.

JOHN MILLEDGE WALDEN.

Witnesses:
GEORGE WASHINGTON MADDOX,
ALBERT DURROHM SKELLIE.